Dec. 8, 1925. 1,565,156
C. G. JANSON ET AL
CONTROLLING DEVICE OPERATING BY THE AID OF A RELAY
Filed July 29, 1922
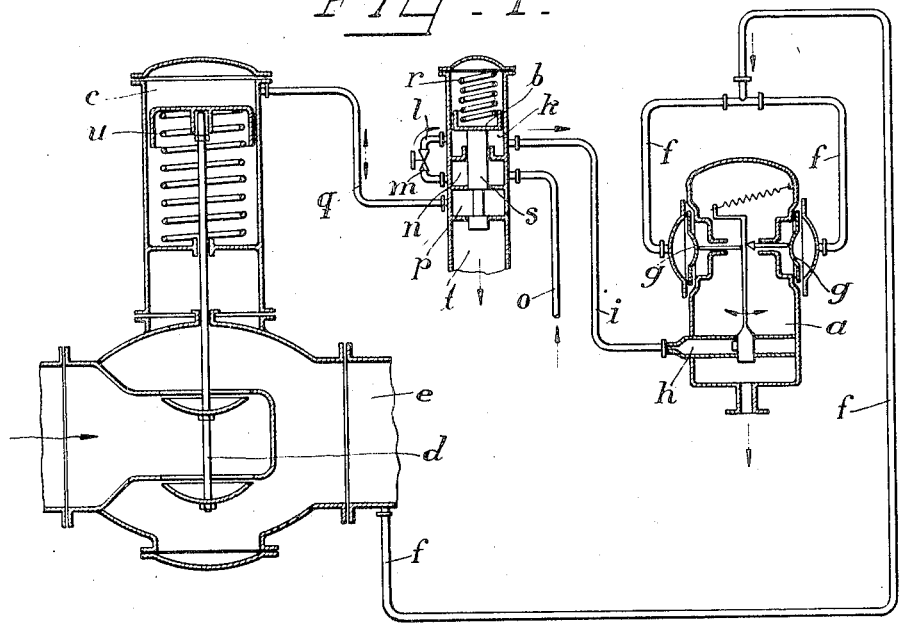
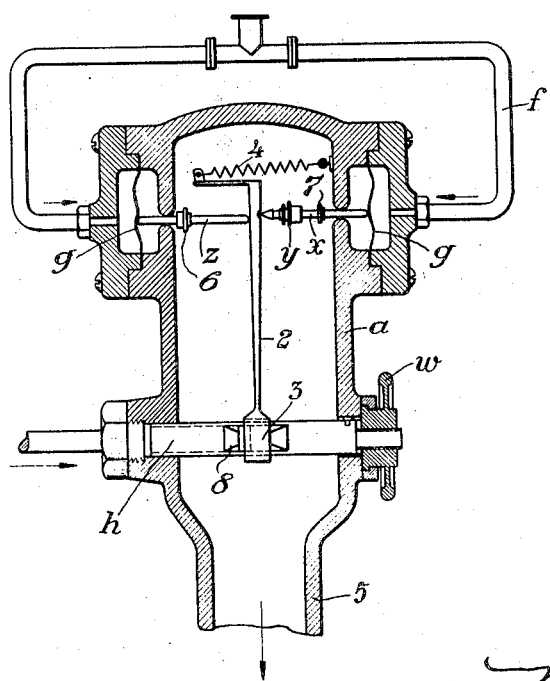
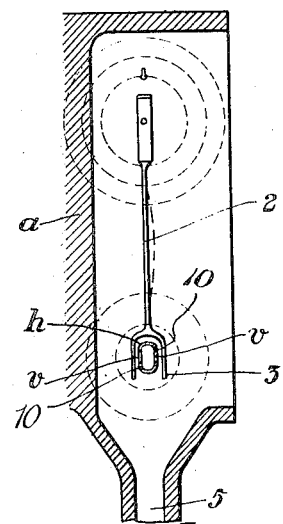
Inventors
C. G. Janson & N. Persson
By Marks Clerk Attys Patented Dec. 8, 1925.

1,565,156

UNITED STATES PATENT OFFICE.

CARL GUSTAF JANSON, OF STOCKHOLM, AND NILS PERSSON, OF LIDINGON, SWEDEN, ASSIGNORS TO AKTIEBOLAGET VAPORACKUMULATOR, OF ERIKSBERGSGATAN, STOCKHOLM, SWEDEN, A CORPORATION.

CONTROLLING DEVICE OPERATING BY THE AID OF A RELAY.

Application filed July 29, 1922. Serial No. 578,521.

*To all whom it may concern:*

Be it known that we, CARL GUSTAF JANSON and NILS PERSSON, subjects of the King of Sweden, and residing at Stockholm and Lidingon, Sweden, respectively, have invented certain new and useful Improvements in Controlling Devices Operating by the Aid of a Relay; and we do hereby declare the following to be a full, clear, and exact description, such as will enable others skilled in the art to make and use the same.

This invention relates to automatic regulation and more particularly to regulation of conditions such as speed, temperature or pressure wherein a main control member is automatically operated in response to variations in the medium to be controlled.

Automatic regulation is principally of two kinds: first, direct, in which the medium which is to be controlled acts on a movable part such as a diaphragm or piston which is mechanically interconnected with the main control member, which may be, for example, a valve and; second, indirect, in which an intermediate non-mechanical agency such as a fluid under pressure is used to transmit the force impulse resulting from change in condition of that which is to be controlled to the main control member.

The present invention more particularly concerns the indirect system of regulation, and especially such apparati as use a liquid for the impulse transmitting agency. Regulators of this type are known in which a jet of liquid issuing from a nozzle is checked by a throttling member moveable in the direction of flow of the liquid, the effect of movement of the throttling member being to change the pressure of the liquid, which pressure change is then utilized to operate a valve controlling flow of liquid to and from a servomotor operating the main control member. This type of regulator presents the disadvantages that the pressure of liquid against the throttling member is not balanced and that the cross-sectional area of flow of the liquid jet must be small, as a result of which the passage for liquid easily becomes clogged, causing serious interruptions in operation.

One object of the present invention is to provide a regulator of the type described in which the pressure of liquid against the throttling member is balanced. Another object of the invention is to allow a greater outflow of the initially controlled liquid in a regulator of the indirect type whereby danger of clogging of passages is minimized. This is accomplished principally by arranging the throttling member to move at an angle with the outflow of liquid. Both of the above mentioned objects are combined in the preferred form of the invention in which the initially controlled liquid, which is a part of what is commonly known as the "relay" of the regulator, is in the form of two streams issuing out from apertures cut in opposite surfaces of a conduit, the streams of liquid being controlled by the prongs of a fork shaped device bridging the conduit, which fork is moved by an actuating impulse in such a manner that the prongs are moved transversely across the streams of liquid, thereby controlling the outflow through the apertures.

A further object of the invention is to provide a more accurate and sensitive transmission of an impulse in that which is to be regulated to the primary regulation member of the regulating organization. This is accomplished by causing the impulse to act simultaneously on a plurality of members such as diaphragms which act additively on the primary regulation member.

A further object of the invention is to provide a novel relay for regulators of the indirect type.

Further objects and advantages will become evident as the description proceeds. The novel features of the invention are shown in the accompanying drawing in which Fig. 1 shows more or less diagrammatically an automatic reducing valve embodying one form of the invention; Fig. 2 shows a sectional view of a part of the organization shown in Fig. 1 on larger scale and Fig. 3 is another sectional view of the same parts taken at right angles to the view of Fig. 2.

The apparatus shown in Fig. 1 consists of four principle parts, a relay $a$, a slide valve $s$, a servomotor $c$ and a main valve or control member $d$. The relay is controlled by the pressure in pipe $e$ beyond the valve $d$, which pressure is the medium to be controlled and is, in the case shown, to be maintained constant. The relay controls the slide valve; the slide valve controls the servomotor; and the servomotor controls the valve $d$.

The relay $a$ comprises a conduit $h$ which is supplied with liquid under pressure from conduit $i$ in a manner presently to be explained and the wall of which constitutes a separating surface between the space containing the liquid under pressure, that is, the inside of the conduit, and the surrounding space which constitutes a space of lower pressure. This surface has one or more apertures $v$ in it through which the pressure liquid flows out into the space of lower pressure. Preferably two apertures are cut in opposite surfaces 10 of the conduit. The liquid may flow freely through these apertures, that is, may flow continuously from the inside space of the conduit into the less confined outer space which is preferably at atmospheric pressure.

Flow of liquid through the apertures $v$ is controlled by throttling members 3, one in front of each aperture. These throttling members are adapted to move parallel to the surfaces 10. Thus, the movement of the throttling members 3 is at right angles to the direction of flow of liquid through the apertures. The throttling members, in effect, slide transversely across the streams of liquid issuing through the apertures. To obtain different speeds or characteristics of regulation the shape of the apertures may be changed.

The throttling members are connected together and to lever 2, forming a fork, bridging conduit $h$. By this construction the pressure of liquid on the throttling members 3 is equalized. The throttling members which might be called the prongs of the fork are made somewhat resilient so that they yield slightly to the pressure of liquid issuing from the apertures. This serves to spread the prongs apart and prevent them from touching the surfaces of conduit $h$. Furthermore, the lever 2 is somewhat resilient in transverse direction to its movement as indicated by the dotted line in Fig. 3 although it possesses stiffness in the direction of movement; that is, the lever is resilient in a direction corresponding to the direction of outflow of the liquid. The purpose of this construction is also to prevent friction between throttling members and conduit $h$. By this means the throttling members will always adjust themselves at a certain distance from the surfaces of the conduit so that an easy and frictionless movement is obtained. If oil is used as the pressure liquid, there will always be a film of oil between the surfaces of conduit $h$ and the throttling members 3.

Lever 2 is rotated by means of pins $x$ and $z$ which at the same time serve to support the lever. Pins $x$ and $z$ are moved by diaphragms $g$ which are subjected to the pressure in pipe $e$ acting through tube $f$. The lever is always held in contact with the pin $x$ by means of spring 4. Pins $x$ and $z$ have longitudinal motion and are positioned out of alignment and act in parallel on opposite sides of lever 2 so that they exert a force couple on the lever. Pin $x$ is positioned so that it exerts a force on the lever, opposing the forces exerted by pin $z$ and spring 4 and the point of application of the force exerted by pin $y$ is intermediate to points of application of the forces exerted by pin $z$ and spring 4. Thus the two forces exerted by pins $x$ and $z$ which are responsive to the same pressure impulse supplement each other and act additively on lever 2.

Adjustment may be effected by means of screw joint $y$ which serves to lengthen or shorten pin $x$. For fine adjustments conduit $h$ is moved longitudinally by means of adjusting screw $w$.

Associated with the slide valve $s$ is a chamber $n$ to which liquid is continuously supplied through the conduit $o$. Chamber $n$ is connected to chamber $k$ by means of connection $l$ having a throttling device $m$ in the same. Conduit $i$, previously referred to, is also connected with chamber $k$. Associated with the slide valve is also chamber $p$ which is connected by means of conduit $q$ with the servomotor. The slide valve proper $s$ is attached to a piston $b$ which is acted on, on the one side, by pressure of liquid in chamber $k$ and on the other side by a spring $r$. By means of the throttling member $m$ a change of outflow of liquid through the apertures $v$ causes a change of pressure in chamber $k$ which moves the slide valve $s$, thereby connecting chamber $p$ and consequently the servomotor either with chamber $n$ and the liquid supply conduit $o$ or waste chamber $t$. This causes a change of pressure in servomotor $c$ which controls the position of valve $d$.

The operation of the regulator is as follows:

Suppose the pressure in pipe $e$ beyond valve $d$ increases for some reason or other. The increase of pressure is transmitted through tube $f$ and acts on diaphragms $g$ causing movement of the same and consequently of pins $x$ and $z$ in direction towards each other. This movement causes rotation of lever 2 in anti-clockwise direction, moving throttling members 3 to the right, thus allowing a greater rate of flow of liquid out through the apertures $v$. The greater outflow through apertures $v$ causes a diminution of pressure inside conduit $h$, in conduit $i$ and in chamber $k$, this being due to the fact that the throttling member $m$ causes a smaller cross-section of connection $l$ than the area of outflow of apertures $v$. Decrease of pressure in chamber $k$ results in downward movement of slide valve $s$ since the force of spring $r$ is then greater than the pressure of liquid exerted on the lower side of piston $b$. This establishes communication between chambers $p$ and $t$, whereby liquid is permitted to flow out of the piston chamber of the servomotor $c$, through conduit $q$ and out through the waste chamber $t$. The force of spring $u$ then overcomes the pressure of liquid in the chamber above the same, and valve $d$ is moved upwardly toward closing position, so that less fluid can flow through the same and the pressure in pipe $e$ beyond the valve is returned to normal.

Should, on the other hand, the pressure in conduit $e$ beyond valve $d$ decrease for some reason, the diaphragms $g$ retract. Owing to the tension of spring 4, the lever 2 is rotated in clockwise direction, the outflow of liquid through apertures $v$ being decreased, with the result that the pressure in chamber $k$ increases, whereby piston $b$ is moved upwardly, causing communication to be established between chambers $n$ and $p$. Liquid then passes from supply pipe $o$, through chambers $n$ and $p$ and into the servomotor chamber causing valve $d$ to be moved downwardly, opening valve $d$ and causing the pressure to rise to normal beyond the valve.

In order to arrest movement of the throttling members 3 to the left, as shown, when the apertures are covered so that, for example, upon a very great decrease of pressure, the throttling members will not pass beyond full closing position, and allow increased outflow of liquid on the right hand side of the throttling members, the conduit $h$ may be provided with a stop 8 at the left hand side of aperture $v$.

The pins $z$ and $x$ may be provided with stops 6 and 7, so that in case one of the diaphragms should burst for any reason, the lever 2 will be turned in the direction necessary for closing the valve $d$.

What we claim as new and desire to secure by Letters Patent of the United States:

1. In a relay for a controlling apparatus having an aperture through which a medium under pressure passes out freely, a throttling member arranged in front of said aperture and movable in a direction forming an angle with the direction of outflow of said medium for controlling the pressure of the outflowing medium.

2. In a control apparatus the combination with a main controlling member, pressure operated means for regulating the position of the member, pressure operated actuating means for indirectly controlling the regulating means, of an impulse receiving relay including a part communicating with the actuating means and having an aperture through which liquid under pressure passes out freely and an impulse receiving throttling member arranged in front of the aperture and movable in a direction forming an angle with the direction of outflow for consequently regulating the pressure in the actuating means.

3. A control apparatus as claimed in claim 2 wherein the relay is provided with two opposite apertures.

4. A control apparatus as claimed in claim 2 wherein the portion of the throttling member which is movable relative to the aperture is constructed resiliently so as to be yieldable to the pressure of the outflowing liquid and thereby avoid a frictional engagement with the apertured part.

5. A control apparatus as claimed in claim 2 wherein the relay is provided with two opposite apertures and the throttling member is constructed in the form of a fork and straddled about the apertured part in a manner so as to be balanced with respect to the liquid flowing out of the apertures.

6. A control appartus as claimed in claim 2 wherein a lever is connected with the throttling member and is responsive to an impulse for effecting movements of the throttling member.

7. A control apparatus as claimed in claim 2 wherein a lever is connected with the throttling member and is responsive to an impulse for effecting movements of the throttling member and is resilient in a direction corresponding to the direction of the outflowing liquid.

8. A control apparatus as claimed in claim 2 wherein the apertured part is adjustable in a direction transversely of the outflowing liquid.

9. In a control apparatus, the combination with a main controlling member, pressure operated means for regulating the position of the member, pressure operated actuating means for indirectly controlling the regulating means, of a relay including a lever, an impulse responsive diaphragm, a slidable adjustable pin between the diaphragm and the lever, a part having an aperture through which liquid under pressure passes out freely and a throttling member connected to the lever and arranged in front of the aperture and movable in a direction forming an angle with the direction of outflow for consequently regulating the pressure in the actuating means.

10. In impulse transmitting means for controlling apparatus, a movable mechanism, a plurality of elements simultaneously responsive to a single impulse and acting additively on said movable mechanism in opposite directions.

11. In a controlling apparatus, the combination with means for controlling a medium to be regulated, of impulse transmitting means associated therewith including a movable part and a plurality of elements simultaneously responsive to a single impulse and acting in parallel and out of alinement on said movable part.

12. A relay for control apparatus comprising a continuously flowing stream of liquid, a movable lever, means associated with said lever to control the flowing stream of liquid said lever being resilient transversely to its direction of movement whereby it can adjust itself with respect to the flowing stream.

13. A liquid pressure operated control apparatus comprising a main controlling member, pressure actuated means for controlling the position of said member, pressure operated actuating means for controlling the pressure in the first mentioned means and a plurality of elements responsive to the same impulse for controlling the pressure in the actuating means.

14. A liquid pressure operated control apparatus comprising a main controlling member, liquid pressure operated means for regulating the position of said member, liquid pressure operated actuating means for controlling the regulating means, a movable part for controlling the pressure in the actuating means, and a pair of elements responsive to the same impulse for controlling said movable part and consequently indirectly controlling the operation of the main controlling member.

15. In a relay for controlling apparatus a casing, a part in the casing having an aperture therein, opposed diaphragms responsive to a single impulse in the casing, a single movable part in the casing for regulating the outflow of pressure medium through the apertured part, a pair of pins slidable in the casing and arranged between the diaphragms and the movable part for supporting and actuating the movable part, stops on said pins for regulating the movement of the pins and said movable part and a spring between the movable part and the casing.

16. A relay for control apparatus comprising a conduit carrying liquid under pressure, apertures in opposite surfaces of said conduit through which liquid under pressure passes out from said conduit, a forked shaped device bridging said conduit, part of the forked shaped device constituting a lever and the prongs thereof constituting throttling members arranged over the apertures, the throttling members and the lever being resilient in the direction of flow of liquid through said apertures, and means to move the lever to cause the throttling members to control the flow of liquid through the apertures.

17. A relay for control apparatus comprising a surface separating a space of higher pressure containing liquid from a space of lower pressure, an aperture in said surface through which liquid flows, a throttling member for said aperture normally spaced from said surface, means to move said throttling member over said aperture parallel to said surface.

18. A relay for control apparatus comprising a conduit carrying liquid under pressure, an aperture in the surface of said conduit, a throttling member normally spaced from said surface, means to slide said throttling member over said aperture.

19. A relay for control apparatus comprising a surface separating a space of higher pressure containing liquid from a space of lower pressure, an aperture in said surface through which liquid flows in a continuous stream, a throttling member for said aperture, means to move said throttling member over said aperture parallel to said surface, a stop on said surface to limit the movement of said throttling member.

20. A relay for control apparatus comprising a surface separating a space of higher pressure carrying liquid from a space of lower pressure, an aperture in said surface through which liquid under pressure flows in a continuous stream, a throttling member, means to move said throttling member in a plane parallel to the said surface to control the discharge of liquid through the aperture.

21. A relay for control apparatus comprising a conduit carrying liquid under pressure, apertures in opposite surfaces of said conduit through which liquid passes out from said conduit, throttling members arranged adjacent each surface so that the liquid issuing from said apertures exerts opposing forces on said throttling members.

22. A relay for control apparatus comprising a conduit carrying liquid under pressure, apertures in opposite surfaces of said conduit through which liquid passes out from said conduit, throttling members arranged adjacent each surface and means to move said throttling members over said apertures parallel to said surfaces.

23. A relay for control apparatus comprising a conduit carrying liquid under pressure, apertures in opposite surfaces of said conduit through which liquid passes out from said conduit, throttling members arranged adjacent each surface, a rigid connection between said throttling members and means to move said throttling members over said apertures parallel to said surfaces.

24. A relay for control apparatus comprising a surface separating a space of higher pressure containing liquid from a space of lower pressure, an aperture in said surface through which liquid flows, a throttling member, means to move said throttling member over said aperture parallel to said surface, said throttling member being constructed resiliently so as to yield somewhat under the pressure of liquid flowing through said aperture.

25. In a relay for control apparatus, an aperture through which a stream of liquid flows, a throttling member adjacent said aperture and normally spaced therefrom, means to move said throttling member transversely to the stream of liquid passing through said aperture to control the same.

26. In a relay for control apparatus, an aperture through which a stream of liquid flows, a throttling member adjacent said aperture, means to move said throttling member transversely to the stream of liquid passing through said aperture to control the same, said throttling member being constructed so as to yield somewhat under the pressure of liquid passing through said aperture so as to avoid frictional engagement with the surface in which said aperture is made.

27. In a relay for control apparatus, an aperture through which a continuous stream of liquid flows, a throttling member adjacent said aperture, means to move said throttling member transversely to the stream of liquid passing through said aperture to control the same, a lever connected to said throttling member, a plurality of elements responsive to the same impulse simultaneously acting on said lever in opposite directions.

28. A relay for control apparatus comprising a lever, elements having longitudinal motion acting on said lever and positioned out of alinement, pressure responsive means acting on and adapted to move said elements so that a force couple is applied to said lever to move the same.

29. A relay for control apparatus comprising a lever, an element having longitudinal movement acting on said lever to move the same in one direction, a spring acting on said lever to move it in the same direction, a second element having longitudinal movement and adapted to move the lever in the opposite direction, the force of the second element being applied at a point on the lever intermediate the points of application of the forces due to the first element and the spring.

30. A relay for control apparatus comprising a lever, an element acting on said lever to move the same in one direction, a spring acting on said lever to move it in the same direction, a second element adapted to move the lever in the opposite direction, the force of the second element being applied at a point on the lever intermediate the points of application of the forces due to the first element and the spring.

31. A relay for control apparatus comprising a freely flowing stream of liquid, throttling means to control said stream, a lever to control said throttling means, means responsive to pressure to exert a force couple on said lever to move the same.

32. In a control apparatus, a main control member, a servomotor to control said main control member, a relay to indirectly control said servomotor, a lever associated with said relay, means responsive to that which is to be controlled to exert a force couple on said lever.

33. In a control apparatus, a main conduit, a valve in said conduit, a servomotor to control said valve, a relay to indirectly control said servomotor, a freely flowing stream of liquid in said relay, throttling means to control said stream, a lever to control said throttling means, means responsive to the pressure in said main conduit behind said valve and operating to exert a force couple on said lever.

34. In a control apparatus, a main conduit, a valve in said conduit, a servomotor to control said valve, a relay to indirectly control said servomotor, a freely flowing stream of liquid in said relay, throttling means to control said stream, a lever to control said throttling means, a plurality of pressure responsive devices, a conduit connecting said pressure responsive devices with said main conduit, means whereby movement of the pressure responsive devices is transmitted to said lever to rotate the same.

35. In a control apparatus, a main conduit, a valve in said conduit, a servomotor to control said valve, a relay to indirectly control said servomotor, a freely flowing stream of liquid in said relay, throttling means to control said stream, a lever to control said throttling means, a pair of opposed diaphragms, a conduit connecting said diaphragms with said main conduit, an element actuated by one of said diaphragms and acting on said lever to move the same in one direction, a spring acting on said lever to move it in the same direction, a second element actuated by the other of said pair of diaphragms and adapted to move the lever in the opposite direction, the force of the second element being applied at a point on the lever intermediate the points of application of the forces due to the first element and the spring.

In witness whereof we have hereunto set our hands.

CARL GUSTAF JANSON.
NILS PERSSON.